United States Patent [19]
Ciora, Jr. et al.

[11] Patent Number: 6,024,880
[45] Date of Patent: *Feb. 15, 2000

[54] REFINING OF USED OILS USING MEMBRANE- AND ADSORPTION-BASED PROCESSES

[76] Inventors: Richard J. Ciora, Jr., 7038 Forrest Trail Rd., Butler, Pa. 16001; Paul K. T. Liu, 4415 Wickford Dr., Pittsburgh, Pa. 15238

[ * ] Notice: This patent issued on a continued prosecution application filed under 37 CFR 1.53(d), and is subject to the twenty year patent term provisions of 35 U.S.C. 154(a)(2).

[21] Appl. No.: 08/606,924

[22] Filed: Feb. 26, 1996

[51] Int. Cl.⁷ .................................................. B01D 61/00
[52] U.S. Cl. ..................... 210/653; 210/651; 210/660; 210/670; 210/679; 210/690; 208/179
[58] Field of Search .................................. 210/650, 652, 210/651, 660, 679, 670, 690, 653, 500.25, 500.26; 426/417; 208/179, 180, 181, 182, 91–99, 251 R, 310 R, 183

[56] References Cited

U.S. PATENT DOCUMENTS

| | | | |
|---|---|---|---|
| 3,607,731 | 9/1971 | Gulick | 208/181 |
| 3,919,075 | 11/1975 | Parc et al. | 208/180 |
| 3,930,988 | 1/1976 | Johnson | 208/182 |
| 4,406,743 | 9/1983 | MacQueen et al. | 196/100 |
| 4,411,790 | 10/1983 | Arod et al. | 210/651 |
| 4,431,521 | 2/1984 | Roarty et al. | 208/134 |
| 4,502,948 | 3/1985 | Tabler | 208/183 |
| 4,512,878 | 4/1985 | Reid et al. | 208/179 |
| 4,650,779 | 3/1987 | Goldstein | 208/310 R |
| 5,209,838 | 5/1993 | Sleppy et al. | 210/651 |
| 5,250,184 | 10/1993 | Maier | 210/49 |
| 5,433,860 | 7/1995 | Yasuda | 210/651 |
| 5,532,163 | 7/1996 | Yagi et al. | 426/417 |

FOREIGN PATENT DOCUMENTS

1164590   3/1984   Canada .

*Primary Examiner*—Ana Fortuna
*Attorney, Agent, or Firm*—Andrew Alexander

[57] ABSTRACT

Disclosed is a method suitable for treating used oil to remove contaminants including ash and color contaminants therefrom to provide a purified oil product. The method comprises the steps of providing a porous inorganic membrane module having a high pressure side and a low pressure side, and a body of oil to be treated. The oil is introduced to the high pressure side of the membrane module to provide an oil permeate on the low pressure side and an ash rich concentrate on the high pressure side thereby separating ash in the oil from the oil permeate. Thereafter the oil permeate is contacted with an adsorbent to remove one of color and odor from the oil permeate to provide a purified oil product. The spent adsorbent can be regenerated and reused.

20 Claims, 5 Drawing Sheets

REFINING OF USED OILS USING MEMBRANE- AND ADSORPTION-BASED PROCESSES

BACKGROUND OF THE INVENTION

This invention is related to the refining of used motor, hydraulic, gear, and other oils using a membrane process as a first step and then an adsorption process as a second step to remove contaminants, such as particulates, ash and color and odorous compounds. The oil recovered through this invented process can be recycled to its original applications or reused for fuel applications.

Nationwide about 13 billion gallons of used motor and other oils are generated annually. About 70% of this is currently being recycled as fuel. The remainder is not collected and is lost in usage. Used motor oil can contain up to 15 to 20% of impurities, such as water, sludge, carbonaceous particles and oxidation products. Generally, the used motor oil contains ~0.5 wt % of ash residue after combustion. For reuse as fuel, this ash creates air pollution concerns. Recycle of the used motor oil as a lubricant, such as crank case fluid, is possible if the contaminants are properly removed, odor is eliminated and/or the color is improved. The cleaned oil can then be reformulated with the required additives to meet specification. Presently only a small volume of the used oil is cleaned for this purpose due to (1) the significant capital investment requirement, (2) potential secondary pollution, and/or (3) substantial operating cost for re-refining the used oil.

By oil as used herein is meant to include all kinds of synthetic and mineral oils including crude oil, and particularly spent or used engine oils, hydraulic oils, cooking oils and the like from which fractions or contaminants such as debris, ash, color or odor can be removed to regenerate the oil and permit its re-use.

Most often, the used oil is an uneven product of oil collected from several sources. The main contaminants typically are:

Water from engines and storage.

Dissolved gasoline and gas-oil, resulting from use in engines.

Solvents, aromatics and cleaning fluids.

Sediments, consisting of
  carbonaceous particles, resulting from bad combustion of motor fuels,
  metal particles, brought in by wear and corrosion, external dust.

Lead from gasoline and anti-knock additives.

Polymeric additives, for viscosity improvement or sludge dispersion (polymethacrylates, polysuccinimides).

Non polymeric anti-oxidant, anti-wear or detergent-dispersing additives (zinc dialkyl-dithiophosphates, calcium or barium salicylates, alcoylphenates or sulfonates).

There are several processes available for the re-refining of the used oil. The ash and other contaminants can be removed by chemical cracking, membrane-based filtration and evaporation. They are discussed as follows:

(1) Chemical Cracking

Acid treatment of the used oil has traditionally been used to flocculate carbonaceous particles and other impurities from the used motor oil. However, this process generates acid sludge, creating environmental concerns and disposal problems. Because the formulation of motor oils is sophisticated, the acid requirement increases and the product yield decreases. In addition, the handling of the concentrated acid involved in this process also presents some operation inconvenience and potential hazard. Although some color removal can be achieved along with the contaminants removal through this process, the oil treated by this process generally requires a polishing step to achieve an acceptable quality of color and smell.

(2) Membrane-based Filtration

In a Canadian patent 1,168,590 (Process for the Treatment of a Hydrocarbon Charge by High Temperature Ultrafiltration), used motor oil was treated with an $Al_2O_3$ and MgO mixed oxide ultrafiltration membrane with pore size ranging from 50 to 250 Å to remove impurities and additives. Although the used oil was reconditioned through this patented process, no color or odor removal was attempted or mentioned. Throughput from the membrane is very limited and is not practical with membrane technology available today. Moreover, the membrane is highly susceptible to fouling by the contaminants. Thus, it will be seen that the membrane-based filtration approach to cleaning spent engine oil is not without problems.

(3) Evaporation/Distillation

Evaporation/distillation of the used oil has been suggested to separate ash and other contaminants from oil. The boiling point of the used oil at atmospheric pressure is in the range of 1,020 to 1,040° F. With the assistance of vacuum, temperature of 650° F. was reported to effectively evaporate oil and leave the contaminants and impurities as residue. Although this process appears to be technically feasible, it is energy intense due to the phase change involved in evaporation. In addition, a polishing step is generally required to deliver an acceptable quality of color and smell.

(4) Hydrotreating

A catalytic hydrotreatment process can improve color of the used oil by destroying the undesirable oxygen and nitrogen containing compounds as well as sulfur and chlorinated species at 650° F. with excess hydrogen in a pressurized vessel. Since cracking of the oil takes place in this process, a post distillation is generally required to fractionate out the desired product. Also, unused hydrogen must be scrubbed to remove HCl before recycle. Sometimes a clay adsorbent is used as a polishing step to further improve color and odor. However, this process is not economically suitable for small scale operation because of the high capital investment requirement.

(5) Clay Adsorption

Clay has been traditionally used to improve color and odor of oil. Thus far, natural clays, such as Bentonite, have been commonly used at 400–450° F. to polish the treated oil from evaporation and acid cracking. These two treatment processes remove a certain degree of colors and/or odor; therefore the clay dosage requirement as a polishing step can be reduced to an economic level. About 0.3 lb/gal of the oil product was reported to reduce the treated oil from the color index of 4 to 2. Then, the clay is disposed through landfill. No regeneration of the clay has been reported.

Catalysts have been suggested to improve the color at a temperature, e.g., 300–400° C., which is much higher than the standard temperature used for adsorption.

SUMMARY OF THE INVENTION

It is an object of this invention to treat oil to remove contaminants therefrom.

It is another object of this invention to remove contaminants such as ash from used oil by membrane filtration.

Yet it is another object of this invention to remove color and odor from used oils by subjecting the used oil to an adsorption process.

And yet it is a further object of this invention to remove ash from spent oil by membrane filtration and to remove the color and odor therefrom by an adsorption treatment.

These and other objects will be apparent from an inspection of the specification, claims and figures attached hereto.

In accordance with these objects, there is provided a method suitable for treating used oil to remove contaminants including ash and color contaminants therefrom to provide a purified oil product. The method comprises the steps of providing a porous inorganic membrane module having a high pressure side and a low pressure side, and a body of oil to be treated. The oil is introduced to the high pressure side of the membrane module to provide an oil permeate on the low pressure side and an ash rich concentrate on the high pressure side thereby separating ash in the oil from the oil permeate. Thereafter the oil permeate is contacted with an adsorbent to remove one of color and odor from the oil permeate to provide a purified oil product.

DETAILED DESCRIPTION OF THE PREFERRED EMBODIMENTS

This invention includes the use of the microporous inorganic membrane, e.g., stainless steel or ceramic, as a first step to pre-treat the used oil, primarily for the removal of particulates and ash in combination with a second step composed of regenerable inorganic adsorbents used for removal of color and odorous compounds. This invention has the following advantages:

(1) No Acid Sludge Generation

Acid sludge generated from the chemical cracking is considered as hazardous waste. Disposal of the sludge is very costly and difficult. In the subject membrane-based filtration system, no chemical reaction takes place and the ash in the residue generated from the membrane system is concentrated. This residue-containing concentrated ash and other contaminants can be further treated to recover the ash for resale as a by-product. The residual oil can be recovered as fuel. Therefore the disposal problems associated with the acid sludge process are eliminated.

(2) Energy Efficient

Evaporation has been used in concentrating ash and other contaminants in the residue while evaporating the majority of oil. This process requires a high temperature and sometimes vacuum to evaporate the oil. In the present process, the membrane removes most of the contaminants. Further, no phase change is involved. Thus, significant energy saving can be achieved.

(3) Regenerability of the Adsorption System

The clay type adsorbent (or sometimes referred to as a catalyst) has been used as a polishing step to remove the color or odor from the oil previously cleaned by evaporation or chemical breaking. This step is considered as a polishing step to upgrade the product value. However, no regeneration of the used clay has been attempted. In the subject process, the adsorbent is used to treat the oil after the membrane filtration. After membrane filtration, the color and smell of the membrane-processed feed is very similar to that of the used oil, thus high levels of the clay must be used at a very high cost. In the subject adsorptive process, which employs regeneration, the color and odors originally present is removed by the adsorbent. The adsorbent useful in accordance with the invention includes alumina, silica, zeolite, anionic clays, such as hydrotalcite, and cationic clay such as bentonites. Both natural and synthetic clays can be used. Thermal and/or solvent regeneration of these adsorbents may be used, which eliminates the disposal cost and reduces the operating cost significantly.

(4) Less Susceptible to Feed Variation

The membrane process is less sensitive to the feed stock variation. The adsorption capacity is less dependent upon the feed stock variation. Therefore, feed variation may vary the adsorption cycle time, but does not upset the process stability and reliability. However, the hydrotreating process requires optimization of the hydrogen partial pressure and temperature with respect to the contaminant concentration to deliver a satisfactory process. The make-up of the used oil collected from miscellaneous sources can vary significantly, which requires close attention to the hydrotreating and other associated processes.

Figure 1:
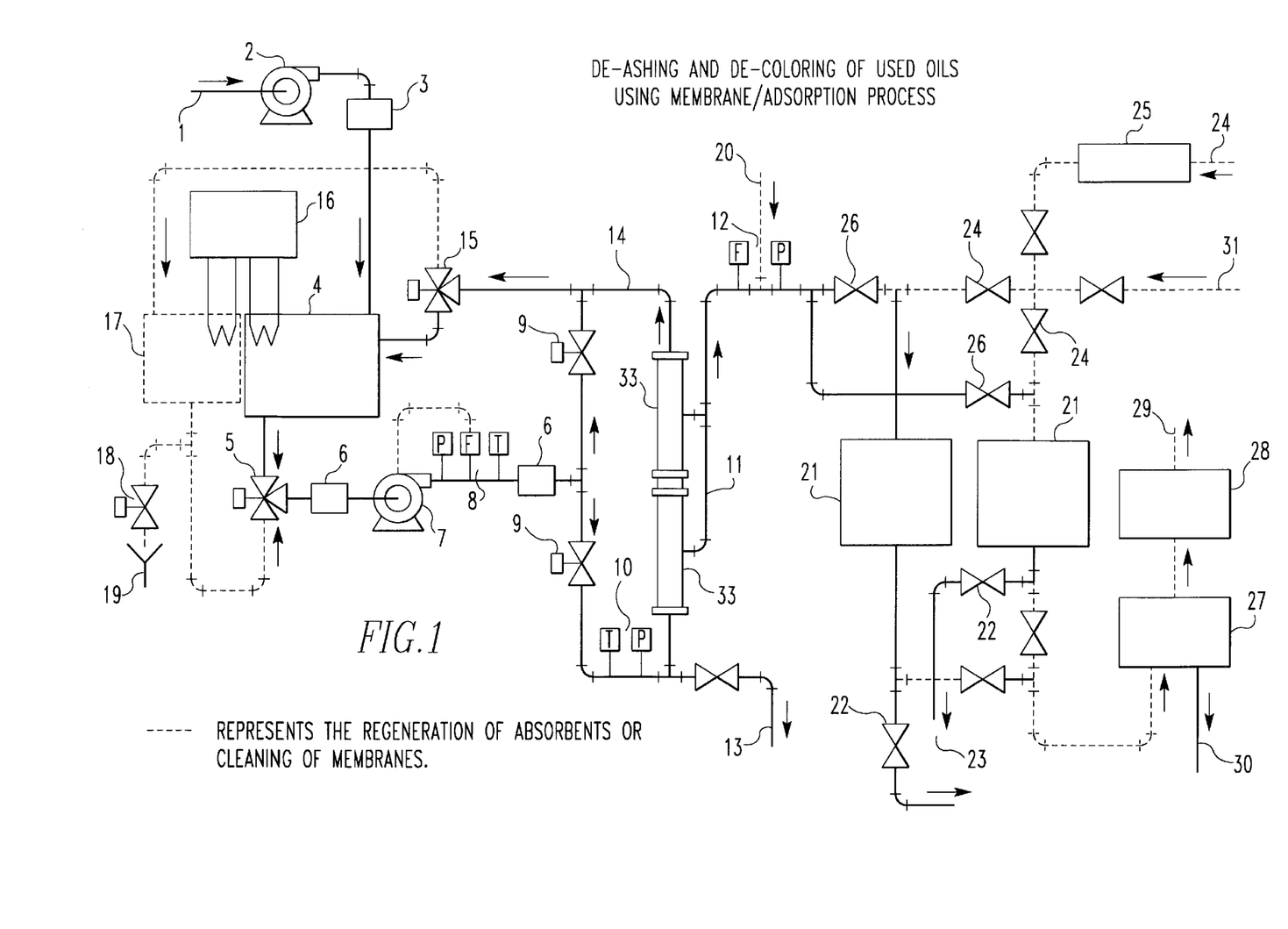
FIG. 1 is a flow diagram showing steps in removing ash and color from used oils using membrane and adsorption process.

FIG. 1 shows an overall process diagram which is composed of both membrane and adsorption processes. Used oil 1 is fed with pump 2 through a pre-filter 3 with ~40$\mu$ pore size to remove bulk particles and debris before entering holding tank 4. The prefiltered used oil is then delivered to the membranes 33 by a feed pump 7. To avoid the vibration by the pump, a vibration isolator device 6 maybe required prior to and after the feed pump 7. Valves 9 are installed to control the distribution of the feed oil to each membrane. Also pressure, flow and temperature meters 8 are installed before the membranes 33 to record the temperature, flow rate and pressure of the feed and to shut off the pump in the event that the flow rate, temperature and the pressure are outside the pre-set range. Permeate with a low ash content is discharged along line 11 as an ash-lean product. Flow rate and pressure sensors 12 may be installed in the permeate line to shut down the system in case the membrane ruptures. The ash-rich product can be withdrawn from the system via the valve 13. The retentate is recycled back to the holding tank along line 14 through a 3 way valve 15. A process heater 16 can be installed to maintain the feed at a desirable temperature. The ash lean product feed or permeate from the membrane system is then fed to the adsorber 21. Valves 26 can be installed to regulate the distribution of the oil to each adsorber. The oil treated in adsorber 21 is then discharged through a valve 22 as product 23 for reuse. The dash line in this drawing illustrates hardware used for cleaning the membrane and regenerating the adsorbent and are described in detail below.

The membrane system can also be operated under a cleaning mode. The adsorption system can also be operated under a regeneration mode. When the membrane permeate flux falls to an unacceptable level due to the gradual irreversible deposition of matter on the membrane surface, membrane cleaning is required to regenerate the membrane. Additionally, the adsorbent can regenerate after it becomes saturated with color bodies or other undesirable matters.

Figure 2:
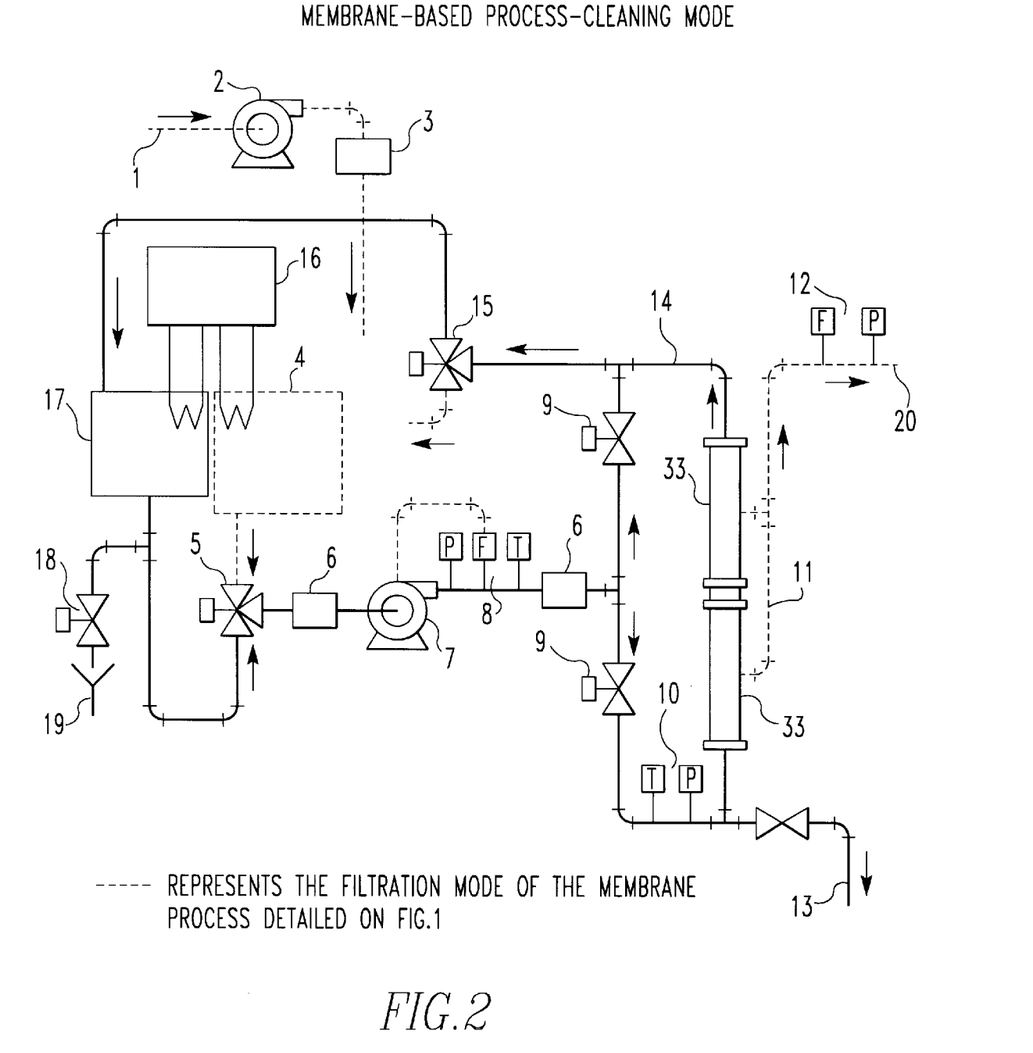
FIG. 2 is a flow diagram showing method steps in cleaning the membranes after use in removing ash.

The membrane operated under the cleaning mode is presented in FIG. 2. The cleaning solution comprised of chloroform or other solvents is stored in tank 17. The cleaning solution can be delivered to the membrane 33 through a 3-way valve 5 with the feed pump 7. Under cleaning, the permeate line is shut off. The cleaning solution is circulated through the membrane 33 and then returned to the feed tank 17 through a 3-way valve 15. The cleaning solution can be re-used for several cycles. The cleaning solution, once spent, can be discharged through a valve 18 and the drain 19. A fresh solution can be refilled into the holding tank through the feed pump 2. Or a separate feed line can be installed for the cleaning solution.

Figure 3:
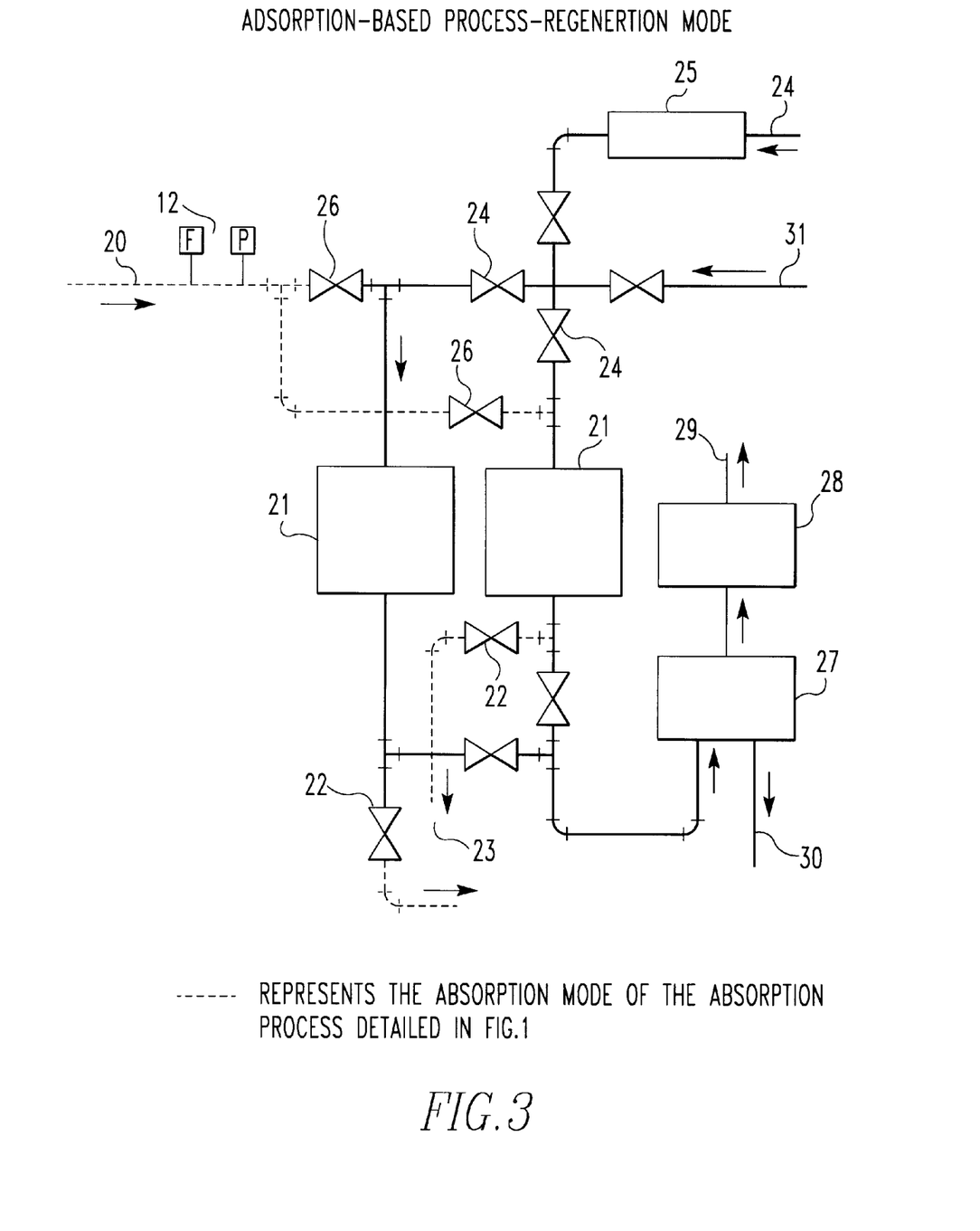
FIG. 3 is a flow diagram showing the step used in regenerating adsorbent used for removing color from oils.

The regeneration mode of the adsorption system is presented in FIG. 3. Hot gas 24, such as air, or combustion products generated from a combustor 25 is fed to the adsorber 21 by opening valves 24 and closing valves 26. The off gas from the regeneration is directed to a condenser 27 by opening valve 25 and closing valves 22. The condensate 30 collected in the condenser 27 can be recovered and recycled back to feed 20. The off gas after condenser 27 can be post-treated with an after burner 28 before discharge to the atmosphere as shown in 29. If desired, an inert gas 31, such as nitrogen, can be used as a purge gas to cool down the adsorber before the next cycle of adsorption. The residual oil in the adsorber after the adsorption cycle can be swept out with a solvent, and then recovered and reused as feed before the hot gas regeneration. Examples are listed as follows to further illustrate the invention.

EXAMPLE 1

De-ashing of spent motor and other waste lubricating oils was conducted using a small scale experimental apparatus similar to the membrane apparatus shown in FIG. 1. Briefly, used oil is heated, e.g., 50 to 250° C., and recirculated under pressure (10 to 250 psi) in a crossflow fashion across the surface of the membrane. The membranes used in this example were ceramic in nature. The membranes were tubular with an ID of 7 mm and a length of 25 cm. Oil that penetrates the membrane is termed permeate and contained significantly reduced ash and heavy metals content in comparison to the feed. The membranes can have pore size in the range of 50 Å to 10 $\mu$m and may be comprised of alumina, zirconia, silica, titania or mixtures thereof. It is desirable to remove at least 50% of the ash using the membrane.

Used motor oil having a kinematic viscosity of 39.7 centistokes (cSt) at 40° C. and an ash content of 0.435% (ASTM-482, "Standard Test Method for Ash from Petroleum Products") was treated using membranes having nominal pore sizes of 500 Å ($Al_2O_3$) and a 200 Å ($ZrO_2$) (both from US Filter, Warrendale, Pa.) at 125 to 185° C. and transmembrane pressures of 10 to 20 psi. Cross flow velocity of 2.91 ft/sec was achieved. Under these conditions the permeance of the membrane was found to be 6 to 15 and 4 to 6 liters per m$^2$ per hour per bar (lmhb) for the 500 Å and 200 Å membranes, respectively. The ash content of the permeate oil from the 500 Å membrane at the end of the first, second and third day of the test was approximately 0.136, 0.092, and 0.041 wt %, respectively. Similarly, at the end of the second day the ash content of the permeate from the 200 Å membrane was about 0.034 wt %. The kinematic viscosity of the permeate oil from the sooA membrane was 30.8 cSt. Hence, significant reduction in the ash content and also in viscosity was achieved using these membranes. Additionally, the permeate from the 500 Å membrane was submitted for the metal content analysis using Inductive Coupling Plasma (ICP). Metals analyzed include beryllium (Be), arsenic (As), zinc (Zn), antimony (Sb), selenium (Se), cadmium (Cd), lead (Pb), copper (Cu), nickel (Ni), and chromium (Cr). The metal contents obtained for the above elements were below the detection limit (<0.2 ppm) in the permeate.

EXAMPLE 2

The apparatus described in Example 1 was used in this example to treat a motor oil from a different source. Used motor oil having a kinematic viscosity of 45 centistokes (cSt) at 40° C. and an ash content of 0.55 wt % was treated using $Al_2O_3$ ceramic membranes having nominal pore sizes of 0.2 $\mu$m and 0.1 $\mu$m (both from US Filter, Warrendale, Pa.) at 129 to 148° C. and transmembrane pressures of 15 to 20 psi. The ash content of the permeate oil from the 0.2 $\mu$m membrane at the end of the first, second, fourth and fifth day of the test was approximately 0.104, 0.070, 0.018, and 0.012 wt %, respectively. Similarly, at the end of first, second, fourth and fifth day the ash content of the permeate from the 0.1 $\mu$m membrane was about 0.089, 0.074, 0.011, and 0.009 wt %. Hence, significant reduction in the ash content was achieved using these membranes with this oil sample.

Once the oil permeance through the membrane had decayed by approximately 70 to 80% of the starting value, the membrane is considered fouled and membrane cleaning should be carried out. Several cleaning methods were examined in an effort to restore the oil permeance through the membrane as detailed below. Initially, hot water with approximately 10 wt % Micro Detergent (Cole Partner, Niles, Ill.) and adjusted to pH of 12 with NaOH was examined as a cleaning media. This solution was circulated through the membrane for three hours. Following this cleaning procedure, the system was drained and rinsed with hot water, drained, rinsed with procedure, the system was drained, dried, and then rinsed with kerosene and drained. The oil permeance of the membrane was then remeasured at the conditions given initially and found to be 70 to 80% less than the original clean membrane permeance. Hence, little if any cleaning of the membrane was demonstrated.

Since less than 50% of the original oil permeance was restored with the above mentioned cleaning solution, several other cleaning solutions were examined. The 0.1 $\mu$m membrane used in this example was cut into ten 1 inch sections and these sections were then cut lengthwise to expose the inside tube(membrane) surface. The inside surface of the tube was coated with a black residue. Next, each pair of 1 inch split sections was placed in a cleaning solution and sonicated for thirty minutes. Nine cleaning solutions were used, namely, (i) 10 wt % Micro in water, (ii) 10 wt % Micro +10 wt % $HNO_3$ in water, (iv) 6 wt % $HNO_3$ in water, (v) hexane, (vi) kerosene, (vii) 10% NaOH in water, (viii) acetone, and (ix) chloroform. The "dirty" membrane was then examined visually to determine the effect of the cleaning solution. All of the water based cleaning solutions showed little or no ability to remove the black residue from the membrane surface. Similarly, hexane and kerosene were not able to remove the residue and acetone was only marginally successful. Only chloroform was able to remove a significant portion of the black residue.

Since the chloroform appeared to be effective in removing the black residue, the 0.2 $\mu$m membrane used above was cleaned by sonicating the membrane for 1 hour in chloroform, storing overnight in chloroform, and then retesting the oil flux through the membrane at the conditions given initially. The membrane permeance of the cleaned membrane was only 20% lower than that of the original fresh membrane well above the desired cut off of 50%.

EXAMPLE 3

The apparatus used in Example 1 was used here to treat a waste oil from a refinery process. Waste oil having a kinematic viscosity of 72.9 centistokes (cSt) at 40° C. and an ash content of 0.68 wt % was treated using $Al_2O_3$ ceramic membranes having a nominal pore size 0.2 μm (US Filter, Warrendale, Pa.) at 168 to 179° C. and transmembrane pressures of 10 to 20 psi. Under these conditions the oil permeance was found to be between 2 to 3 lmhb. The ash content of the permeate oil from the 0.2 μm membrane at the end of the second day was 0.0034 wt %. The permeate oil viscosity was 45.3 cSt. Hence, significant reduction in the ash content and viscosity was achieved using this membrane with this oil sample.

EXAMPLE 4

The apparatus used in Example 1 was used here with a motor oil from a different source. Used motor oil having a kinematic viscosity of 27.1 centistokes (cSt) at 40° C. and an ash content of 0.87 wt % was treated using $Al_2O_3$ ceramic membranes having nominal pore sizes of 0.2 μm and 0.1 μm (US Filter, Warrendale, Pa.) at 140 to 160° C. and transmembrane pressures of 12 to 54 psi. Under these conditions the permeance of the membrane was found to be 6 to 15 and 4 to 6 liters per $m^2$ per hour per bar (lmhb) for the 0.2 μ and 0.1 μ membranes, respectively. The ash content of the permeate oil from the 0.2 μm membrane at the end of the second and fourth day of the tests was approximately 0.197 and 0.109 wt %, respectively. Similarly, at the end of second and fourth day the ash content of the permeate from the 0.1 μm membrane was about 0.157 and 0.109 wt %, respectively. Hence, significant reduction in the ash content was achieved using these membranes with this oil sample.

EXAMPLE 5

Used motor oil was diluted to 50% by volume in kerosene and having a kinematic viscosity of 10.2 centistokes (cSt) at 40° C. and an ash content of 0.27 wt %. This diluted oil with the apparatus as described in Example 1 was treated with $Al_2O_3$ ceramic membranes having nominal pore sizes of 0.2 μm and 40 Å (from US Filter, Warrendale, Pa.) at 118 to 125° C. and transmembrane pressures of 10 to 40 psi. Under these conditions the permeance of the 0.2 μm and 40 Å membranes was found to be 4 to 20 and 0.5 to 1.3 lmhb.

EXAMPLE 6

A pilot unit similar to the apparatus described in Example 1 was used to treat used motor oil having a kinematic viscosity of 28.03 centistokes (cSt) at 40° C. and an ash content of 0.182 wt %. A $Al_2O_3$ ceramic membrane with a honeycomb configuration (Media and Process Technology Inc., Pittsburgh, Pa.) having a nominal pore size of 0.05 μm and surface area of 0.42 $m^2$ was used for filtration at 80 to 100° C. and transmembrane pressures of 10 to 20 psi. Under these conditions the permeance of the membrane was found to be 12 to 16 lmhb. The ash content of the permeate oil at the end of the first, second, and third day of the experimental test was approximately 0.129, 0.048 and 0.050 wt %, respectively. The kinematic viscosity of the permeate oil was determined to be 13.4 cSt. Hence, significant reduction in the ash content and viscosity was achieved using this membrane.

EXAMPLE 7

In this Example, a pilot unit similar to the apparatus described in Example 1 was used. Hydraulic oil having a kinematic viscosity of 28 centistokes (cSt) at 40° C. and an ash content of 0.094 wt % was treated using a multichannel $Al_2O_3$ membrane with a nominal pore size of 0.2 μm (US Filter, Warrendale, Pa.) and a total surface area of 0.2 $m^2$ at ~114° C. and transmembrane pressures of 10 psi. Under these conditions the permeance of the membrane was found to be 13 lmhb. The ash content of the permeate oil at the end of the 30-hour run was approximately 0.024 wt %. Hence, significant reduction in the ash content was achieved using this membrane.

EXAMPLE 8

Although significant ash and heavy metal removal was achieved with the membranes for a variety of used oil samples as described in the examples above, only minimal color and odor removal was achieved, even with the 40 Å membrane. To improve color and odor removal, the ability of various adsorbents to remove the color and odor from the low ash oil samples generated using the membranes above was conducted. Initial screening of various adsorbents was conducted using a typical laboratory adsorption apparatus. The adsorbent to be tested was packed to a depth of 12 inches in an 18 inch long by ½ inch outside diameter stainless tube and placed vertically in either an oven at temperatures between 55 and 65° C. or on a bench top at room temperature (22 to 25° C.). Low ash permeate oil was fed into the top of the column. Oil that emerged from the bottom of the column via gravity force was characterized for color and odor reduction. The oil can be introduced at 25 to 200° C. to the adsorbent.

Colors of the oil samples generated during the adsorption tests were determined via comparison with standard oil samples calibrated using ASTM-D1500, "Standard Test Method for ASTM Color of Petroleum Products." Additionally, the degree to which the burnt oil smell of the low ash permeate was removed via the adsorbent was determined. Specifically, three broad classifications have been adopted, namely, (i) "good" indicating all "burnt" smell removed, (ii) "fair" indicating some odor removal, and (iii) "SAF" indicating that the smell was the same as the feed. Several of the adsorbents also generated an oil product with a sulfurous/mercaptan odor as indicated below.

EXAMPLE 9

Eight inorganic adsorbents were screened for color and odor removal from the permeate oil generated in Example 1 using the 200 Å membrane. They included activated alumina (S-100 from ALCOA, Vidalia, La.), zeolites, 3A, 4A, 5A and 13X (from Linde, Danburry, N.J.), Silicalite (from UOP, Des Plaines, Ill.), silica gel (from Davison Chemical), anionic clay, such as hydrotalcite (HTC 24 from ALCOA, Vidalia, La.), and activated carbon (F-400 from Calgon, Pittsburgh, Pa.).

The ash content of the permeate oil was 0.034 wt % and the metals analysis revealed all metals to be below the detection limit of the ICP instrument. All of the inorganic adsorbents were ground to less than 100 mesh if necessary and calcined at 580° C. for six hours prior to being packed in the columns described above. Activated carbon was calcined at 120° C. for 3 hours. The columns were placed in an oven at 65° C. and the oil was fed into the top of the column. The color and odor of the oil that emerged from the bottom of the column were determined at 1, 5, and 10 ml increments collected and are given in Table 1.

TABLE 1

Color and Odor of the Permeate Oils Through Columns Packed with the Various Adsorbents Screened Samples

| | Initial 1 ml | | at 5 ml | | at 10 ml | |
|---|---|---|---|---|---|---|
| Adsorbents | Color | Odor | Color | Odor | Color | Odor |
| activated alumina | >8 | Good | >8 | Good | >8 | Good |
| 3A zeolite | 2.0 | Good | 6.0 | Fair | NA | NA |
| 4A zeolite | L2.0* | Good | 2.5 | Good | SAF | Good |
| 5A zeolite | SAF | Fair | SAF | SAF | NA | NA |
| 13X zeolite | 0 | Good | 2.0 | Good | 6.0 | Good |
| silica gel | >8 | Good | NA | NA | NA | NA |
| hydrotalcite | 0 | Good | NA | NA | NA | NA |
| silicalite | >8 | Fair | NA | NA | NA | NA |
| activated carbon | >8 | SAF | NA | NA | NA | NA |

NA: Not Available
SAF: Same as feed to column
*Light end of the color index 2

For the purpose of color removal, zeolite, such as 3A, 4A and 13X, anionic adsorbents, such as hydrotalcite, exhibited various degrees of color removal. For the purpose of odor removal, activated alumina, zeolites, such as 3A, 4A and 13X and silica gel exhibited various degrees f odor removal. Activated carbon and zeolites, such as silicalite, were not effective in either color or odor removal.

EXAMPLE 10

Adsorption tests were also conducted to determine the color and odor removal capacity of commercially available adsorbents (cationic clays, e.g. bentonite) used in de-coloring refinery oils, specifically, an acid leached bentonite from Engelhard Company (Jackson, Miss.) and an untreated bentonite from Aldrich Chemicals (Milwaukee, Wis.). Since these materials were available as powders, no grinding was necessary. The adsorption screening tests were conducted with both uncalcined material as well as material calcined at 650° C. for six hours. The adsorption tests were conducted at 58° C. using the apparatus described in Example 9. Table 2 shows the results for these materials.

TABLE 2

Color and Odor of Permeate Oil Through Columns Packed with Acid Leached Bentonite and Untreated Bentonite

| Adsorbent | Calcination | Color* | Odor* |
|---|---|---|---|
| Acid Leached Bentonite | at 650° C. | 0 | Sulfurous |
| | Uncalcined | 2.5 | Fair |
| Untreated Bentonite | at 650° C. | 3.5 | Good |
| | Uncalcined | L2.5 | Good |

*Initial sample collected

Although the acid leached material displayed excellent color removal, sulfurous/mercaptan like odor is developed in the product oil. Untreated bentonite gives an excellent degree of color removal although its removal efficiency is somewhat less than that of the treated bentonite. No unfavorable odor was generated from the untreated bentonite.

EXAMPLE 11

As a comparison with Example 10, the spent motor oil that was used as a feed in Example 4 and had not been membrane-treated was fed to the column to determine the color and odor removal capability of adsorbent on the motor oil prior to the membrane treatment. The acid leached bentonite from Engelhard was calcined at 650° C. overnight and placed in an adsorption column as given in Example 9. However, because of the high solids loading of the sample, the column plugged and no oil was collected from the bottom of the column.

EXAMPLE 12

Following the initial screening tests, the two adsorbents, specifically the hydrotalcite and the acid leached bentonite, were chosen for further adsorption tests in this example. Two important performance criteria were examined, namely, (I) color and odor removal capacity, and (ii) regenerability as outlined in the examples below. Feed oil without pretreatment by the membrane sample was used in this example as a control for comparison with Example 13 using the membrane treated oil sample.

A 13.9 g hydrotalcite (an anionic clay) powder sample was calcined overnight at 650° C. and then packed into a stainless steel column (termed adsorber) 18" long by ½" O.D. Two thermocouples to measure the temperature were attached to the outside of the adsorber. The adsorber was then wrapped with heating tape and insulation. Oil that was not membrane treated was fed into the adsorber using a high pressure pump at a flowrate of ~2 cc/hr and a pressure of 0.1 to 2 bar. The ash content of the oil was about 0.435 wt %, the color was black and opaque and the oil had a slight burnt smell. The adsorber temperature was maintained at 70° C. using a temperature controller and variac. The initial sample of oil that emerged from the adsorber was compared with the feed sample. No observable change in sample color or smell was found.

EXAMPLE 13

In contrast to Example 12, the membrane treated low ash oil generated in Example 7 was used to evaluate the odor and color removal efficiency by the same adsorbent. A 13.8 g hydrotalcite powder sample was calcined at 650° C. overnight and packed into the adsorber as described in Example 12. The oil was fed to the adsorber at ~2 cc/hr. The temperature of the adsorber was maintained at 70° C. Oil that emerged from the column was collected in 7 fractions (or cuts) and the color and odor was determined. Table 3 shows the results of this test.

TABLE 3

Color and Odor Removal Capability of Freshly Calcined Hydrotalcite

| Cut [-] | Weight [g] | Color [-] | Odor [-] |
|---|---|---|---|
| 1 | 3.7 | 0 | Good |
| 2 | 7.1 | 1.5 | Good |
| 3 | 6.6 | L2.0 | Good |
| 4 | 8.9 | 2.5 | Good |
| 5 | 7.8 | 6.0 | Good |
| 6 | 2.1 | >8.0 | Fair |
| 7 | 4.9 | >8.0 | Fair |
| Total | 43.2 | | |

The total adsorbent capacity is 0.432 gallons of produced oil per pound of adsorbent. The adsorbent capacity for oil with a color less than ASTM Index 8 was approximately 0.304 gallons of produced oil per pound of adsorbent.

EXAMPLE 14

The adsorbent used in Example 13 was regenerated to determine any loss in capacity of the material during regenerability of the adsorbent. The following regeneration schedule was used:

(i) The adsorbent was flushed with 200 ml of hexane to remove the interparticle and non-adsorbed oil from the adsorber. The oil was collected in a beaker and the hexane was evaporated yielding approximately 37 ml of oil recovered from the adsorber. The recovered oil represented approximately 96% of the residual oil left in the void volume of the adsorber.

(ii) The adsorber was then placed in a tube furnace and heated to 450° C. under an air purge to burn off any adsorbed oil. After 12 hours the adsorbent was cooled to 70° C. using an air purge.

(iii) The adsorption experiment described in Example 13 was then repeated.

This adsorption/regeneration cycle was conducted five times. The color and odor removal results are given in Table 4 for the 5th adsorption run.

TABLE 4

Color and Odor Removal Capability of Hydrotalcite After the Fifth Adsorption/Regeneration Cycles

| Cut [-] | Weight [g] | Color [-] | Odor [-] |
|---|---|---|---|
| 1 | 3.5 | L1.0 | Good |
| 2 | 7.6 | 1.0 | Good |
| 3 | 7.0 | L2.0 | Good |
| 4 | 8.8 | 5.0 | Good |
| 5 | 5.5 | >8.0 | Fair |
| Total | 32.4 | | |

The total capacity is 0.324 gallons of produced oil per pound of adsorbent. The adsorbent capacity for oil with a color less than ASTM Index 8 was approximately 0.269 gallons of produced oil per pound of adsorbent. Hence, majority of the adsorption capacity was restored using the protocol listed here throughout the 5 cycles of adsorption/regeneration study.

EXAMPLE 15

The experiment conducted in Example 13 was repeated with 25.3 g of acid leached bentonite calcined at 650° C. for 12 hours. Table 5 shows the results for color and odor removal from the treated low ash oil sample.

TABLE 5

Color and Odor Removal Capability of Freshly Calcined Acid Treated Bentonite

| Cut [-] | Weight [g] | Color [-] | Odor [-] |
|---|---|---|---|
| 1 | 11.4 | 0.0 | Good |
| 2 | 23.1 | 1.5 | Sulfur/Mercaptan like |
| 3 | 23.4 | 2.5 | Sulfur/Mercaptan like |
| 4 | 26.4 | 8.0 | Sulfur/Mercaptan like |
| Total | 84.3 | | |

At the adsorption temperature of 70° C., cuts 2, 3, and 4 smelled of sulfur/mercaptan like. The overall capacity of the adsorbent was determined to be 0.46 gal of produced oil per pound of adsorbent, similar to that of the hydrotalcite.

EXAMPLE 16

The acid treated bentonite used in Example 15 was regenerated using the protocol described in Example 14. Results of the second adsorption run following regeneration are given in Table 6.

TABLE 6

Color and Odor Removal Capability of Hydrotalcite Following Five Adsorption/Regeneration Cycles

| Cut [-] | Weight [g] | Color [-] | Odor [-] |
|---|---|---|---|
| 1 | 9.8 | 0 | Slight Sulfur/Mercaptan like |
| 2 | 16.3 | 2.5 | Sulfur/Mercaptan like |
| 3 | 15.5 | 7 | Sulfur/Mercaptan like |
| 4 | 11.4 | 8 | Sulfur/Mercaptan like |
| Total | 53.0 | | |

The total adsorbent capacity is 0.29 gallon of produced oil per pound of adsorbent. This example shows that this adsorbent can be regenerated. The smell for the sample generated from the second cycle is slightly less than that for the first cycle described in Example 15.

EXAMPLE 17

Figure 4:
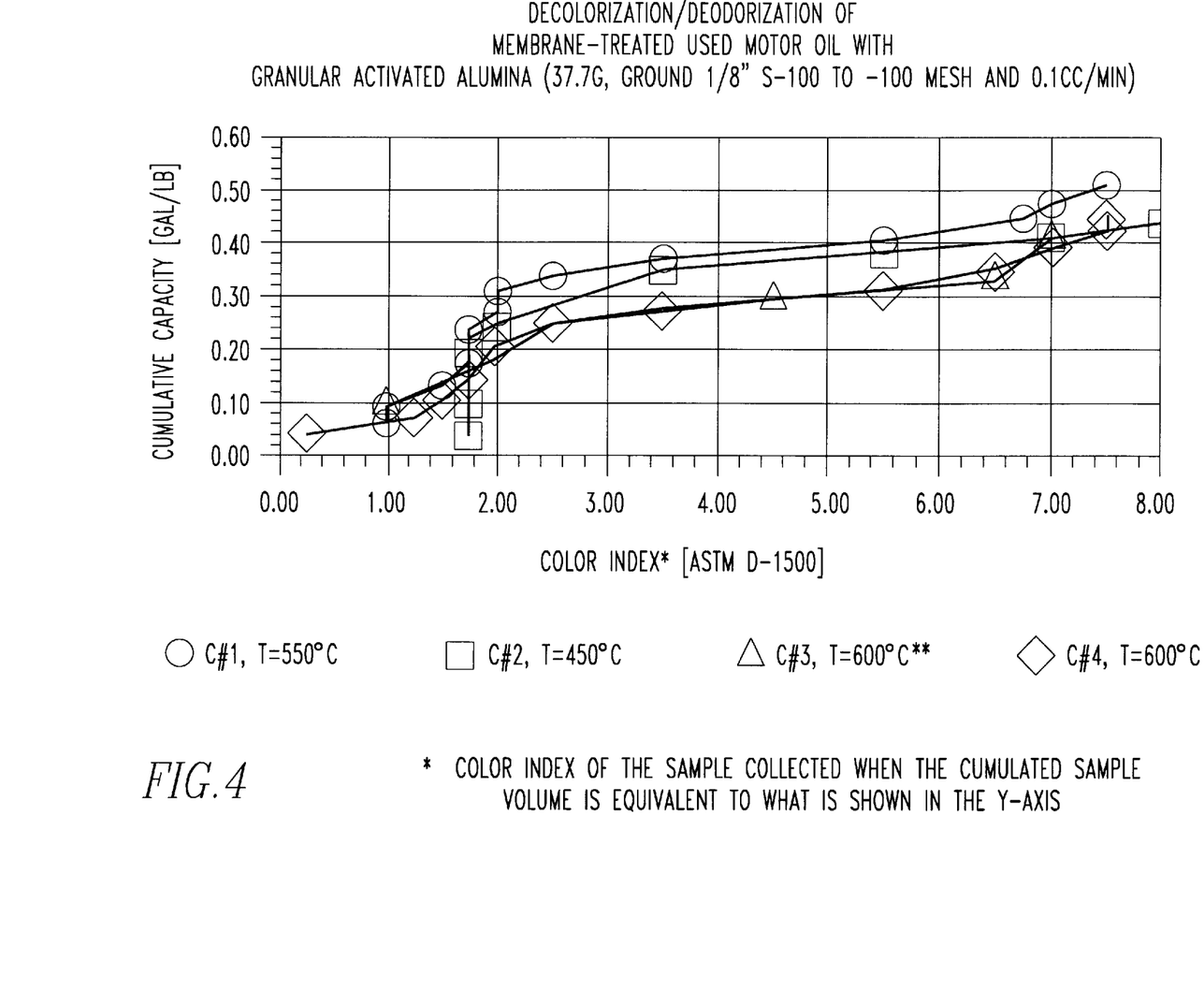
FIGS. 4 and 5 are graphs showing the removal of color and odor from used oil using adsorbents through several adsorption/regeneration cycles.

Commercial activated alumina was used in this example to evaluate its color removal efficiency for the membrane-treated oil. Activated alumina (⅛" sphere of S-100, from Alcoa, Vidalia, La.) was ground to less than US standard mesh size 100 and then pre-calcined to 550° C. for use. About 37.7 gram of the material was packed into the column similar to the one described in Example 13. The same feed as used in Example 13 was pumped into the column at 0.2 cc/min at room temperature. The cumulative effluent collected vs its corresponding color index is presented in FIG. 4 labeled as C#1. About 0.5 gal/lb of oil was collected when the color index of the effluent reached 8. The odor for the oil collected was considered "good" as described in Example 8. The adsorbent was then thermally regenerated in the presence of air for the following three adsorption cycles. The temperature used is 450, 600, and 600° C. respectively for the cycle 2, 3, and 4 labeled as C#2, C#3, and C#4. Greater than 80% of the adsorption capacity was recovered for the effluent collected up to the same color index as C#1. Activated alumina can be used effectively for the decolorization and deodorization of the membrane-treated oil; moreover, >80% of the adsorption capacity was restored through thermal regeneration. Example 9 may have used a much higher flow rate; as a result inefficient color removal was observed with this material.

EXAMPLE 18

Figure 5:
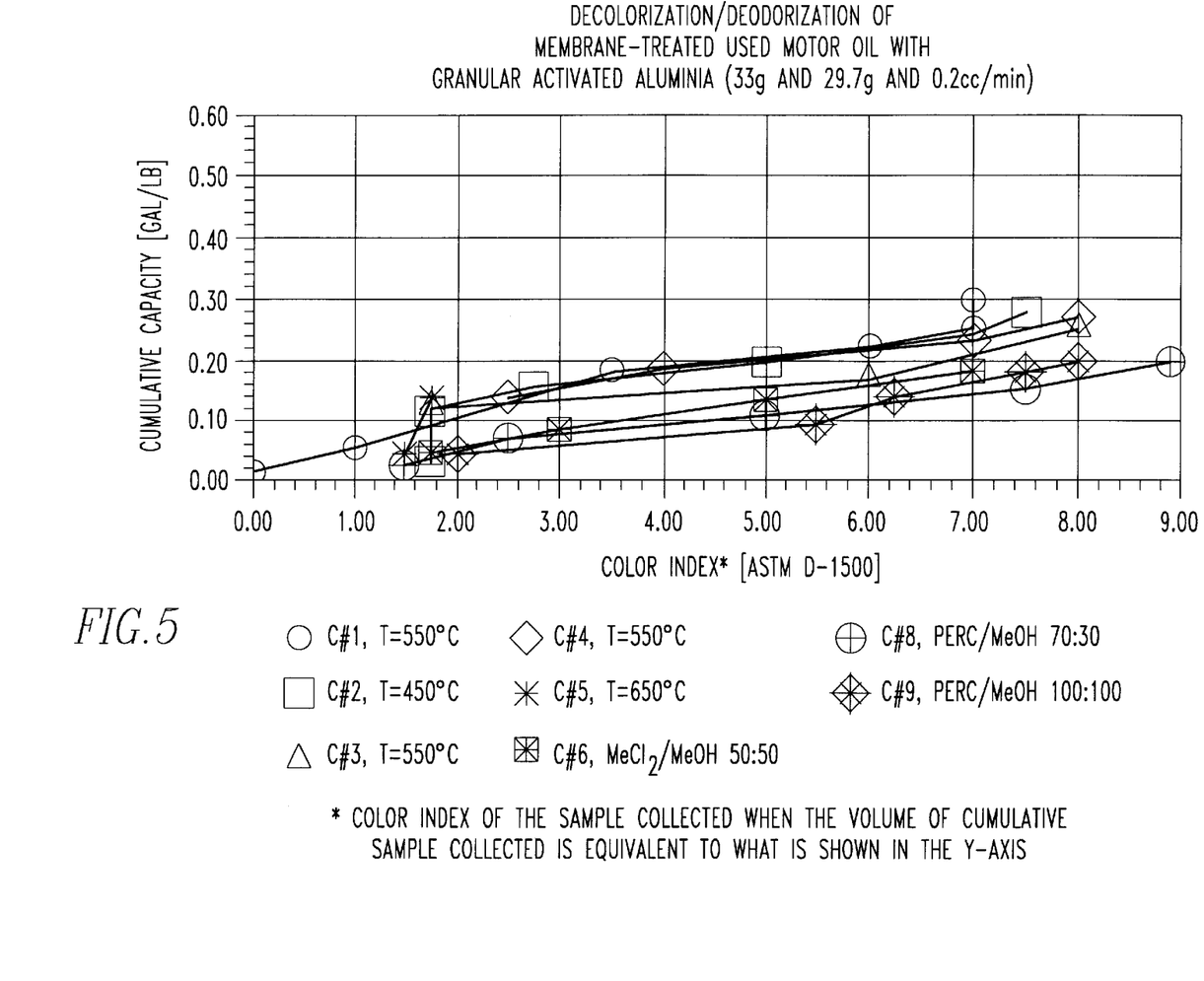

A granular activated alumina with mesh size less than 20 (US Standard) and greater than 48 was used in this example with the feedstock and set-up similar to that described in Example 12. After precalcination at 500° C. about 33.29 gram of the adsorbent was packed in the column. The adsorption capacity for the first cycle (labeled as C#1 in FIG. 5) was 0.3 gal/lb of adsorbent for an effluent color index of 7. Greater than 90% of adsorption capacity was restored through thermal regeneration for cycles 2, 3, 4 and 5 labeled as C#2, C#3, C#4, and C#5 in FIG. 5. In the subsequent cycles (labeled as C#6, C#8, and C#9) the adsorbent was solvent regenerated by pumping about 300 to 400 cc of solvent through the column at 10 cc/min and 40–80° C. A variety of solvents were tried, specifically (i) a 50/50 mixture of methylene chloride/methanol for C#6, (ii) a 70/30 mixture of tetrachloroethylene/methanol for C#8, and (iii) a 100% tetrachloroethylene followed by a 100% methanol solvent sweep. Following solvent treatment, the adsorbent was dried at 200° C. in an air purge for several hours. Then the column was reinstalled back in the adsorption system. Approximately 50 to 70% of the adsorption capacity was restored based upon the cumulated sample collected up to the color index of 8 to 9. Evidently solvent regeneration is a viable alternative method to thermal regeneration to reactivate the saturated adsorbent.

While the invention has been described in terms of preferred embodiments, the claims appended hereto are intended to encompass other embodiments which fall within the spirit of the invention.

What is claimed is:

1. A method suitable for treating used oil to remove contaminants including ash and color contaminants therefrom to provide a purified oil product, the method comprising the steps of:
   (a) providing a porous inorganic membrane module having a high pressure side and a low pressure side;
   (b) providing a body of oil to be treated;
   (c) introducing oil to the high pressure side of said membrane module to provide an oil permeate on the low pressure side and an ash rich concentrate on the high pressure side thereby separating ash in said oil from said oil permeate;
   (d) contacting said oil permeate with an adsorbent at a temperature of less than 120° C. to remove one of color and odor from said oil permeate to provide a purified oil product; and thereafter
   (e) periodically regenerating said adsorbent.

2. The method in accordance with claim 1 including heating said oil to a temperature in the range of 50 to 250° C. prior to introducing said oil to said high pressure side of said module.

3. The method in accordance with claim 1 wherein said porous ceramic membrane has a pore size in the range of 50 Å to 10 μm.

4. The method in accordance with claim 1 including maintaining a pressure in the range of 10 to 250 psi in said high pressure side of said membrane module.

5. The method in accordance with claim 1 wherein said inorganic membrane is comprised of one of alumina, zirconia, silica and titania and mixtures thereof.

6. The method in accordance with claim 1 including diluting said oil with a solvent prior to introducing to said high pressure side.

7. The method in accordance with claim 6 including diluting said oil with a solvent selected from kerosene, diesel fuel and jet fuel.

8. The method in accordance with claim 1 including removing at least 50% of the ash from said oil.

9. The method in accordance with claim 1 wherein said adsorbent is selected from at least one of the adsorbent from the group consisting of activated alumina, zeolite, silica gel, anionic clay, and cationic clay.

10. The method in accordance with claim 1 including contacting said oil permeate with said adsorbent at 25 to 120° C.

11. The method in accordance with claim 1 including periodically regenerating said membrane to remove ash deposits therefrom.

12. A method suitable for treating used oil to remove contaminants including ash and color contaminants therefrom to provide a purified oil product, the method comprising the steps of:
   (a) providing a porous inorganic membrane module having a high pressure side and a low pressure side, having a pore size in the range of 50 A to 10 um;
   (b) providing a body of oil to be treated;
   (c) heating said body of oil a temperature in the range of 50 to 250° C. to provide heated oil;
   (d) introducing said heated oil to the high pressure side of said membrane module to provide an oil permeate on the low pressure side and an ash rich concentrate on the high pressure side, the oil in the high pressure side maintained at a pressure in the range of 10 to 250 psi thereby separating ash in said oil from said oil permeate;
   (d) contacting said oil permeate with an adsorbent at a temperature of less than 120° C. to remove one of color and odor from said oil permeate to provide a purified oil product, the adsorbent selected from at least one of the adsorbents from the group consisting of activated alumina, zeolite, silica gel, anionic clay, and cationic clay; and thereafter
   (e) periodically regenerating said adsorbent.

13. The method in accordance with claim 12 wherein said inorganic membrane is comprised of one of alumina, zirconia, titania, silica and mixtures thereof.

14. The method in accordance with claim 12 including periodically regenerating said membrane to remove ash deposits therefrom.

15. The method in accordance with claim 12 including periodically regenerating said adsorbent.

16. In an improved method of treating oil to remove color and odor therefrom, wherein said oil is first treated to remove ash to provide treated oil having lowered ash content, the improvement including:
   (a) introducing said oil to the high pressure side of an inorganic membrane module and producing an oil permeate a low pressure side of said membrane module; and
   (b) contacting said oil permeate having a temperature of less than 120° C. and having a lowered ash content with an adsorbent to remove at least one of color and odor, the adsorbent selected from at least one of adsorbents from the group consisting of activated alumina, zeolite, silica gel, anionic and cationic clay; and thereafter
   (c) periodically regenerating said adsorbent.

17. The method in accordance with claim 16 including regenerating said adsorbent by exposing said adsorbent to a temperature in the range of 300 to 800° C. in the presence of air.

18. The method in accordance with claim 16 including regenerating said adsorbent by treating with an organic solvent.

19. The method in accordance with claim 16 wherein said porous inorganic membrane is a ceramic membrane comprised of at least one of the group consisting of alumina, silica, titania and zirconia and mixtures thereof.

20. In an improved method of treating oil to remove color and odor therefrom, wherein said oil is first treated to remove ash to provide treated oil having lowered ash content, the improvement including:

(a) introducing said oil to the high pressure side of an inorganic membrane module and producing an oil permeate at a low pressure side of said membrane module;

(b) contacting said oil at a temperature less than 120° C. and having lowered ash content with an adsorbent to remove at least one of color and odor, the adsorbent selected as cationic clay; and (c) regenerating said cationic clay by exposing said adsorbent to a temperature in the range of 300 to 800° C. in the presence of air.

* * * * *